United States Patent

[11] 3,597,659

[72] Inventors Carl K. Hoffman; John A. Laster; George R. Urish, all of Albuquerque, N. Mex.

[21] Appl. No. 860,526

[22] Filed Sept. 24, 1969

[45] Patented Aug. 3, 1971

[73] Assignee The United States of America as represented by the United States Atomic Energy Commission

[54] MOUNT FOR ELECTRONIC CIRCUITS AND THE LIKE AND METHOD FOR MAKING SAME
3 Claims, 5 Drawing Figs.

[52] U.S. Cl. .......... 317/101 D, 29/624

[51] Int. Cl. .......... H02b 1/04

[50] Field of Search .......... 317/101 D, 101, 99; 333/34 M, 33 M; 29/624—627

[56] References Cited

UNITED STATES PATENTS

| | | | |
|---|---|---|---|
| 2,910,672 | 10/1959 | Patka | 317/101 D (UX) |
| 2,976,806 | 3/1961 | Risk et al. | 317/101 D (UX) |
| 3,029,368 | 4/1962 | Wull | 317/101 D (UX) |
| 3,234,433 | 2/1966 | Braunagel | 317/101 D (UX) |
| 3,340,439 | 9/1967 | Henschen et al. | 317/101 D (UX) |

*Primary Examiner*—David Smith, Jr.
*Attorney*—Roland A. Anderson

ABSTRACT: A mount for electronic circuits and the like including two annularly or cylindrically shaped frames mountable one upon the other to form an interior cavity, each frame having a plurality of axially extending holes through the walls thereof to receive a plurality of service conductors, and a plurality of key-shaped tabs extending from the service conductor into the interiorly defined cavity between the two frames, and being adhesively secured to the other frame. A plurality of coaxial feedthrough conductors may also be axially disposed within the frame walls to carry signals therethrough without disturbing or interfering with the operation of the electronics contained within the cavity. The method for making the mount includes the steps of forming the frames, forming the key-shaped tabs on a single central support portion of a solder coated sheet, placing and soldering each service conductor in a hole in one of said key-shaped tabs, disposing the service conductors and key-shaped tab assembly within the holes in the frames, affixing the frames together, and removing the central support portion.

*INVENTORS*
CARL K. HOFFMAN
JOHN A. LASTER
GEORGE R. URISH
BY [signature]

*INVENTORS*
CARL K. HOFFMAN
JOHN A. LASTER
GEORGE R. URISH

BY Roland A. Anderson
ATTORNEY

MOUNT FOR ELECTRONIC CIRCUITS AND THE LIKE AND METHOD FOR MAKING SAME

BACKGROUND OF INVENTION

During the past decade, printed circuit board technology, transistors and integrated circuits have been the subject of phenomenal interest and development. Presently, complete circuits which may perform a large number of independent functions may be formed or encapsulated in a single small package. For example, a complete radio receiver or transmitter or any portion thereof may be contained in a package about the size of an ordinary tubular capacitor. Or, digital and logic circuitry, portions of complete digital or analog computers, or the like may be mounted on printed circuit boards of relatively small size which may be complete in themselves or used in concert with other similarly mounted electronics. In many applications, it has been found convenient to separate various portions of electronic equipments into individual circuitry sections to perform singular independent functions. Since ordinarily the circuitry of such single sections cooperate in combination with other circuitry, it is often convenient to provide a mount for each of the individual sections to contain and protect the section, to ease handling and transporting, and to allow and simplify interconnections with other similarly mounted sections.

An additional advantage of mounting each of the various circuitry sections in individual mounts can be readily seen since the mounts can be interconnected merely by plugging them together in a desired sequence. For example, if the various sections of a radio transmitter were each in individual mounts, a failing audio section of the transmitter could be easily repaired merely by unplugging the audio section mount and exchanging another mount containing a substitute audio section for it. Similarly, if including additional amplifier stages becomes desirable the number of such stages may be increased by merely plugging together the additional desired number of amplifier mounts.

Ordinarily, such mounts provide some service means for making electrical connections of the input, output, bias voltages, test signals and the like to the electronic circuitry; frequently, it is desirable that each of such means be terminated in a pluggable device to readily attach to and interconnect with circuitry of other mounts. Aside from this desirable feature, in some instances it may be additionally desirable to include in the mount a plurality feedthrough connectors, and perhaps shielded feedthrough connectors, to carry signals which are to be isolated and shielded from the contained circuitry, or which are not intended for connection with the circuit in the particular mount, but which may be generated in proximity to it as a result of its operation. Thus in the above transmitter example, having such shielded feedthrough conductors available to carry the generated radio frequency energy past the electronic circuits without allowing it to be induced into and interfere with the elements and the components of the circuits is of particular advantage.

Because the circuitry and associated mounts may be subjected to rugged and severe environments, it may be additionally desirable to completely encapsulate each circuit within its respective mount with a potting material such as foam, plastic, or the like. Hence it is desirable that the mount be capable of receiving and containing a potting material or the like without the material interfering with the mount or its electrical service connectors and plugs.

BRIEF SUMMARY OF INVENTION

In light of the above, it is, therefore, an object of the present invention to present a mount in which an electronic circuit may be mounted.

It is a further object of the invention to provide a mount which may be plugged into similar mounts to interconnect the respectively contained electronic circuitry.

It is yet a further object of the invention to provide a mount in which shielded conductors may be contained to carry electrical signals past the contained circuitry without the carried signals interfering with the components and operation of the circuitry.

It is still a further object of the invention to provide a mount in which the contained circuitry may be potted without such potting material affecting the reliability and interconnectability of the mount.

It is yet a still further object of the invention for making the aforesaid mount.

These and other objects, features and advantages will become apparent to those skilled in the art from the following description when read in conjunction with the appended claims and attached drawings.

The mount of the invention includes two annularly or cylindrically shaped frames adhesively affixed one upon the other to axially contain within its walls a plurality of service conductors each of which is terminated at respective opposite sides of the mount by a male and a female plug to facilitate interconnections with other similar mounts. Affixed to each service conductor is a key-shaped tab which extends between the frames into an interiorly defined cavity containing desired electronic circuitry, each key-shaped tab being connectable to a desired portion of the contained circuitry to make that portion and its respective service conductor electrically common. A tongue portion is formed at the top of the upper cylindrically shaped frame and a corresponding mating groove is formed by the bottom of the other frame to allow the mount to be plugged into or placed in a stacked relation with similar mounts to interconnect the respectively contained circuitry in a desired manner.

BRIEF DESCRIPTION OF THE DRAWING

The invention is illustrated in the accompanying drawing wherein.

The sizes and shapes of the various parts shown in the drawing have been exaggerated for clarity of description and illustration. Like reference numerals in the various figures of the drawing denote like parts.

DESCRIPTION OF THE PREFERRED EMBODIMENT

Figure 1:
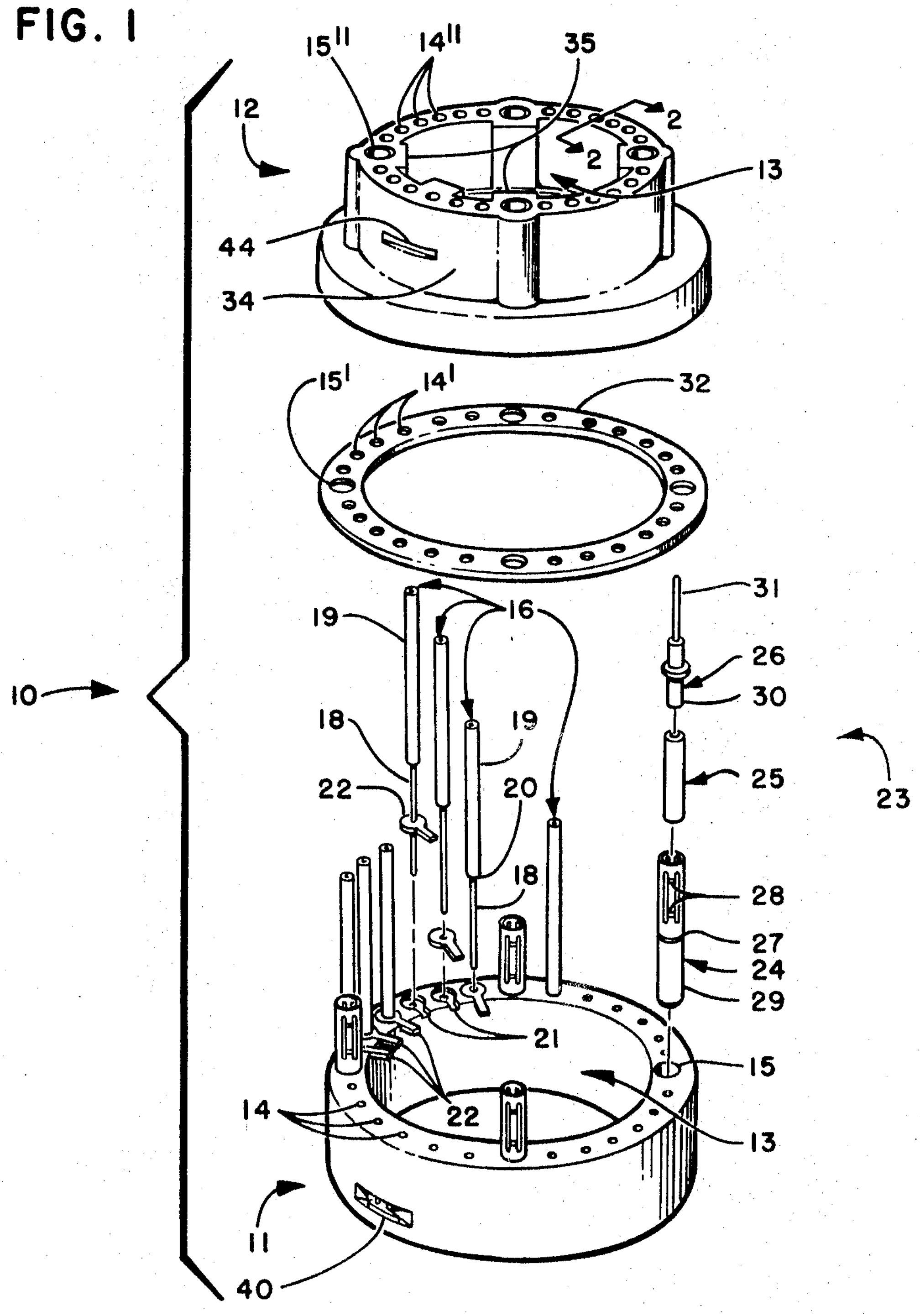
FIG. 1 is an exploded perspective view of the mount in accordance with the invention.
Figure 2:
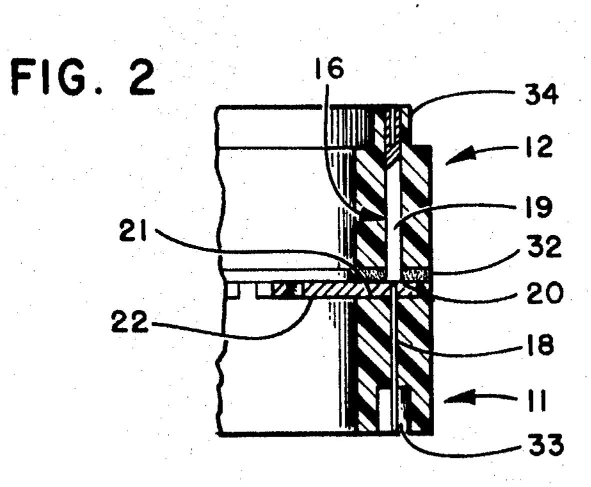
FIG. 2 is a cross-sectional view of the mount taken along lines 2–2 in FIG. 1.

As illustrated in FIG. 1, the mount 10 of the invention includes two cylindrically shaped frames forming a base 11 and a top 12 mutually mountable to form a unitary body. Base 11 and top 12, as illustrated, form an interior cavity 13 into which electronic circuitry may be disposed, as discussed below in detail. Base 11 and top 12 may be of any convenient material such as glass, plastic, bentonite, rubber, or the like, and may be molded or otherwise shaped and formed in the configurations illustrated. Base 11 has a plurality of holes, such as holes 14 and 15, axially formed at desired locations through its walls to accommodate a portion of the service conductors 16 and coaxial feedthrough conductors 23. Holes 14 and 15 may be cut or drilled in base 11, or alternatively, may be molded during the molding process in forming the base 11. The service conductors 16 may be of any conductor material, such as gold, copper, or the like, and have formed at either end a male plug 18 and a female plug 19. Since the female plug 19 is adapted to receive a male plug, as male plug 18, of an adjoining mount the outside diameter of female plug 19 is of larger diameter than male plug 18, creating a shoulder or ridge 20 at their junction. The service conductors 16 may be disposed as shown, with each male plug contained within a hole 14 to the ridge 20, the male plug 14 extending approximately to the bottom of base 11 (see the cross-sectional view of FIG. 2).

Affixed to each service conductor 16 and extending inwardly into cavity 13 through channels or grooves 21 is a key-shaped tab 22 disposed flush with the upper surface of base 11. The key-shaped tabs 22 may each be of a single piece of an electrically conducting metal having a hole cut therethrough to receive the male plug 18 of service conductor 16. Ridges 20 may be soldered to the key-shaped tabs 22 to make physical and electrical connection thereto. The portion of key-shaped tab 22 which extends into cavity 13 is soldered to a portion of the printed circuit board or circuitry therein contained, to support and carry the board or circuit and make the portion to which it is connected electrically common with its respective service conductor 16.

Similarly a plurality of coaxial plugs, such as coaxial plugs 23 may be partially contained in base 11. Each coaxial plug 23 may have a cylindrical insulating sleeve 24 enclosing a dielectric cylinder 25 and an inner conductor 26. Sleeve 24 may contain ridges 27 and 28 to respectively retain dielectric cylinder 25 and contact the male portion of another coaxial plug, such as male portion 29, of an adjoining mount. The inner conductor 26 may be of similar configuration to the service conductors 16, having a female plug 30 and male plug 31. When assembled, each coaxial plugs 23 is partially disposed in a hole 15, extending approximately to the bottom of base 11, similar to service conductors 16.

Top 12 may be formed in a similar manner as base 11 by molding, etc., may be of the same material as base 11, and may contain a similar corresponding plurality of holes as base 11, such as holes 14'' and 15'', in alignment with respective holes 14 and 15 in base 11. Since, as above described, the outside diameter of female plug 19 of service conductors 16 is of larger diameter than the male plug 18, holes 14'' will necessarily be larger than the corresponding holes 14 in base 11.

Base 11 and top 12 may be securely joined together to form a unitary frame by an adhesive ring 32, of any adhesive material. Adhesive ring 32 may have holes cut therein, such as holes 14' and 15' corresponding to the holes in base 11 and top 12. The adhesive material may be of any type, such as those activated by heating, or pressure, or the like. The use of the particular shape illustrated is of particular advantage in forming a gasket seal between base 11 and top 12. Thus, when an electronic circuit is mounted within cavity 13 of mount 10 and encapsulated therein with a potting material or the like, the gasket formed by adhesive ring 32 prevents the potting material from seeping into holes 14, 14'', 15, and 15'' and interfering with and clogging the plugs and parts of mount 10.

As above said, a plurality of unitary mounts such as described in FIG. 1 may be stacked one upon the other. To facilitate such stacking, the mount may have formed therein a groove at the bottom of base 11 and an interfitting tongue on the upper most portion of top 12, illustrated particularly in FIG. 2. The groove 33 may be cut so that a segment of the male plug 18 of the service conductors 16 and a segment of the male portion 29 of coaxial plugs 23 extend thereinto. On the top 12, a tongue 34 may be formed having a pattern negative that of the groove 33 but allowing the female portions of service conductors 16 and coaxial plugs 23 to be exposed at the surface. With the tongue 34 of shape generally negative that of the shape of groove 33, when a second mount is placed thereupon the male segments 18 of service conductors 16 of the first mount will make electrical contact to the female portions 19 of the service conductors of second mount corresponding in position thereto. The coaxial connectors, of course, will be similarly interconnected. To assure proper alignment between the corresponding service conductors of the interconnected mounts, various sized keys, such as keys 35, may be provided on tongue 34 to match in a unique position with keyways (not shown) in groove 33.

Figure 3:
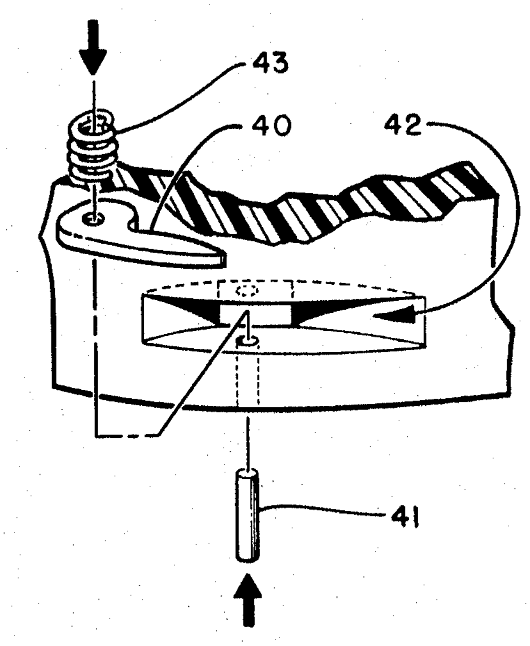
FIG. 3 is a perspective view of an outside portion of the mount of FIG. 1 illustrating a locking mechanism thereof.

To assure that adjoining mounts are securely fastened together, a locking means is provided in each base 11, illustrated in FIG. 3. The locking device may comprise a cam-lever 40 rotatably mounted on a shaft 41 within a groove or recess 42 extending through an outer wall of base 11 into the interior groove 33. A spring 43 may also be disposed upon the shaft 41 above cam-lever 40 within groove 42 to aid in maintaining a set or desired position of cam-lever 40. A locking groove 44 is cut in the tongue 34 of top 11 in a position corresponding with groove 42 to allow the cam portion of cam-lever 40 to be rotated into a locking relationship with groove 44, thus securely holding the first mount to the second. For example, as described above and illustrated in FIG. 4, a plurality of the unitary mounts such as illustrated in FIG. 1 may be stacked one upon the other. As shown, a mount 10 comprised of base 11 and top 12 may be plugged into a similar mount 100 comprised of base 110 and top 120, and locked therein by cam-lever 40.

To make external electrical connection to the service conductors 16 of the two bodies, end plates 60 and 61 are provided. End plate 60 contains within a groove a plurality of male plugs 62 which interconnect with the service conductors 16 and a plurality of coaxial connectors 64 which interconnect with the coaxial plugs 23 of the tongue portion of mount 100. The male plugs 62 and 64, which extended through and beyond the end of terminating top 60, may have solder cups or particular shapes to which wire wire connections may be made. Similarly, end plate 61 presents a tongue containing a plurality of female plugs 65 to make connection to the service conductor plugs 16 and female connectors 66 to connect the coaxial plugs 23 of contained in the groove 33 of base 10. Connectors 65 and 66 similarly may have solder cups or particular shapes to which electrical wire connection may be made. Additionally, end plate 60 may include a cam-lever mechanism 40' to lock to mount 100; and end plate 61 may have a recess formed into its tongue portion to be locked by the cam-lever 40'' of mount 10.

Figure 4:
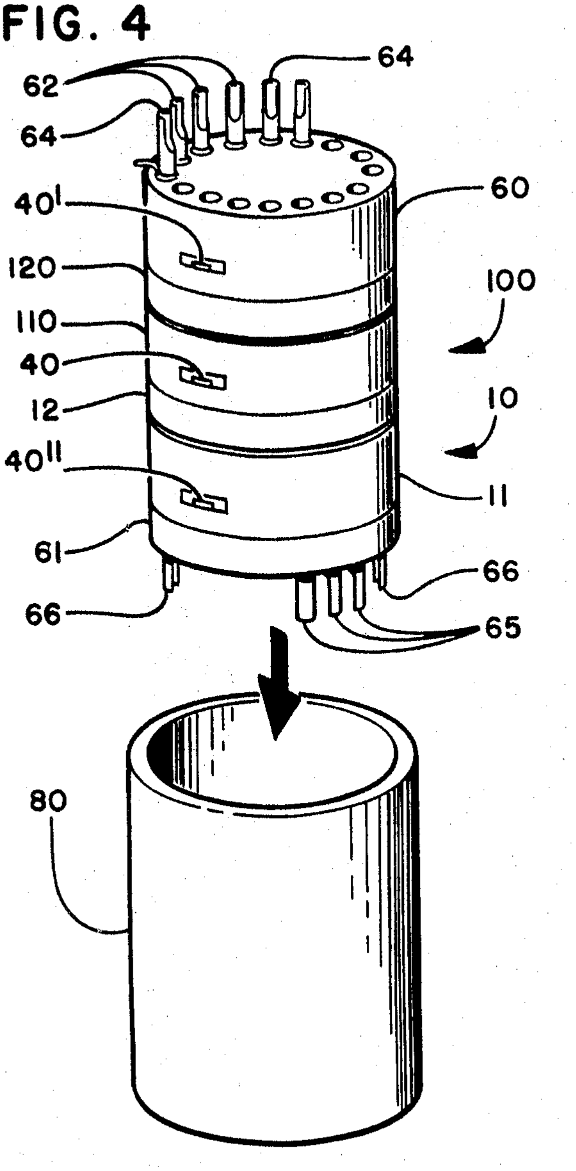
FIG. 4 is a perspective view of two mounts in accordance with the invention stacked one upon the other and including termination connection plates at both ends thereof.

The entire structure illustrated in FIG. 4 may be mounted in a cylindrical housing 80 for convenience if desired.

Figure 5:
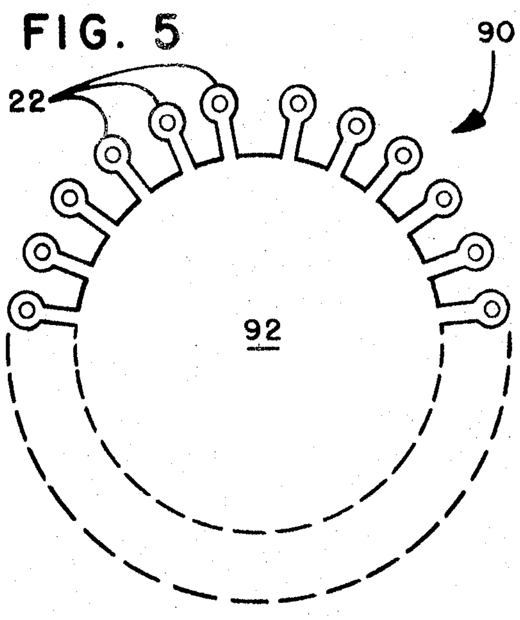
FIG. 5 illustrates the shape of an intermediate part which may be used to facilitate the formation of the key-shaped tabs to the service conductors of the mount of the invention.

Because of the large number of tabs 22 which may be required to connect service conductors 20 to the intermounted electronics difficulty of construction may be encountered. A preferred method of construction, which simplifies the procedure utilizes the intermediate part 90 illustrated in FIG. 5. The part is cut or stamped from a beginning sheet of a conductor material such as beryllium-copper coated with tin-lead or other solder-type material. The pattern cut or stamped may be similar to that illustrated in which each of the ultimate key-shaped fingers or members 22 extend radially outward from a central portion 92. The male portion of plugs 18 of the service conductors 16 may be inserted into each hole cut or formed in key members 22, and the entire assembly exposed to an arc or to heat sufficient to melt the solder or tin-lead previously formed on the sheet of conductor material, thereby soldering and making electrical connection between the service conductors 16 and the key-shaped tabs 22. The entire assembly may then be positioned in the base 11, with the male portions 15 of the single conductor plugs 12 disposed in the holes 14. After the conductor and contact pin assembly has been so disposed, center portion 92 may be removed thereby leaving just the key-shape tab portions 22 as illustrated in FIG. 1 extending inwardly into cavity 13. The top member 12 may then be glued as above described with adhesive ring 32.

With a mount, such as mount 10 illustrated above, constructed as described, an electronic circuit may be easily mounted within cavity 13 merely by placing the circuitry in cavity 13 and soldering key-shaped tabs 22 to the desired portions of the circuit. This may be easily accomplished, for example, in mounting a printed circuit board with associated electronic and electrical components wherein the key-shaped tabs 22 are merely soldered to portions of the printed circuit board. The printed circuit board would then be physically carried by the solder connections between the board and key-shaped tabs 22; however, it may be desirable to encapsulate the electronics and printed circuit with a potting material to additionally supply rigidity and strength.

To be pointed out at this juncture is that although the mount has been illustrated with 24 service conductors and four coaxial feedthrough conductors, these numbers may be increased or decreased for particular applications.

Although the invention has been described and illustrated with a certain degree of particularity it is understood that the present disclosure has been made by way of example only and that numerous changes and modifications in the details of construction and the combination and arrangement of parts may be resorted to without departing from the spirit and scope of the invention.

What we claim is:

1. A mount for receiving, carrying, and making electrical connections to an electronic circuit comprising; a first frame having a groove perimetrically about the bottom thereof and having a plurality of holes extending therethrough into said groove; a second frame mounted on said first frame and defining an interior cavity therewith, said second frame having tongue portion formed perimetrically about the top thereof and having a plurality of holes extending therethrough and through said tongue portion, each of said holes corresponding in position and aligning coaxially with one of said holes of said first frame; a plurality of electrical conductors, each disposed in one of said plurality of holes and extending between said tongue and said groove, and having a male and a female end; a plurality of tabs each making electrical contact to one of said electrical conductors and extending therefrom between said first and second frames into said cavity; a plurality of coaxial conductors mounted in said first and second frames in alignment with the axes of said plurality of electrical conductors; locking means for securing one of said mounts to another when said mounts are placed in tongue and groove relationship, said locking means including a cam-lever having a hole through said cam, and disposed in a groove through the outer wall of said first frame in a position corresponding to the position of a groove in said tongue of said second frame and being actuatable by movement of said lever arm to extend said cam into said groove; and a shaft mounted in said groove and extending through said hole in said cam to allow said cam to be pivotally and rotatably movable thereon; and adhesive means for affixing said first and second frames together; whereby when an electronic circuit is disposed in said cavity and electrical connection made between said tabs and portions of said electronic circuit, said electronic circuit is carried by said mount and each of said portions of said module is electrically common with one of said plurality of conductors, and when one of said mounts is placed in tongue and groove relationship with another, the male and female ends of corresponding connectors and the respective coaxial conductors are electrically plugged together and when said cam is rotated in said groove, said cam engages the groove in the tongue portion of said other mount to secure said mounts together.

2. The method for making a mount for electronic circuits and the like comprising: forming a first frame with a groove perimetrically about the bottom thereof and with a plurality of holes extending therethrough into said groove; cutting a sheet of electrically conducting material coated with solder-type material to form a plurality of fingers extending radially outwardly from an interior support portion, each finger corresponding in position and having a hole disposed coaxially with one of said plurality of holes of said first frame; placing in each hole of said fingers the male portion of one of a plurality of electrical conductors having a male end and a female end; heating said fingers to melt the solder thereby electrically connecting said fingers to said conductors; disposing a first portion of each of said electrical conductors in said holes of said first frame; forming a second frame with a tongue portion perimetrically about the top thereof and with a plurality of holes extending through said frame and said tongue, each hole corresponding in position and aligning coaxially with one of said holes of said first frame to accommodate a second portion of said conductor, said second frame being mountable on said first cavity to define an interior cavity affixing said first and second frames together; and removing said interior support portion from said fingers, thereby leaving a plurality of tabs sandwiched between said first and second frames each making electrical contact to one of said electrical conductors and extending therefrom between said first and second frames into said interior cavity.

3. The method of claim 2 wherein said step of heating said fingers to melt the solder is achieved by exposing said fingers to an electrical arc discharge.